United States Patent
Mihara et al.

(10) Patent No.: US 7,830,240 B2
(45) Date of Patent: Nov. 9, 2010

(54) MULTILAYER POSITIVE TEMPERATURE COEFFICIENT THERMISTOR

(75) Inventors: Kenjirou Mihara, Higashiomo (JP); Atsushi Kishimoto, Kusatsu (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 0 days.

(21) Appl. No.: 12/562,969

(22) Filed: Sep. 18, 2009

(65) Prior Publication Data
US 2010/0001828 A1      Jan. 7, 2010

Related U.S. Application Data

(63) Continuation of application No. PCT/JP2008/054997, filed on Mar. 18, 2008.

(30) Foreign Application Priority Data
Mar. 19, 2007   (JP)   ............... 2007-070206

(51) Int. Cl.
*H01C 7/10*   (2006.01)
(52) U.S. Cl. .................. 338/22 R; 338/307
(58) Field of Classification Search ........... 338/22 R, 338/13, 260, 328, 307
See application file for complete search history.

(56) References Cited

U.S. PATENT DOCUMENTS 6,040,755 A * 3/2000 Abe et al. ............. 338/22 R
7,075,408 B2 * 7/2006 Mihara et al. ............. 338/22 R

FOREIGN PATENT DOCUMENTS

| JP | 6-302403 | 10/1994 |
| JP | 2002-217004 | 8/2002 |
| JP | 2004-134744 | 4/2004 |
| JP | 2005-93574 | 7/2005 |
| JP | 2002-43167 | 8/2008 |
| WO | WO 2007/034830 | 3/2007 |
| WO | WO 2007/034831 | 3/2007 |

* cited by examiner

*Primary Examiner*—Kyung Lee
(74) *Attorney, Agent, or Firm*—Dickstein, Shapiro, LLP.

(57) ABSTRACT

A multilayer positive temperature coefficient thermistor includes a ceramic body having semiconductor ceramic layers and internal electrodes, the semiconductor ceramic layers being mainly composed of $BaTiO_3$ and containing semiconductor-forming agents, the semiconductor ceramic layers and the internal electrodes being alternately stacked, and the outermost layers of the ceramic body being formed of the semiconductor ceramic layers. The outermost layers serve as protective layers. The semiconductor ceramic layers arranged between the internal electrodes 4a and 4d serve as effective layers. The protective layers contain a semiconductor-forming agent having a larger ionic radius than that of a semiconductor-forming agent contained in the effective layers. The protective layers have a lower porosity than that of the effective layers.

20 Claims, 1 Drawing Sheet

US 7,830,240 B2

MULTILAYER POSITIVE TEMPERATURE COEFFICIENT THERMISTOR

This is a continuation of application Ser. No. PCT/JP2008/054997, filed Mar. 18, 2008.

TECHNICAL FIELD

The present invention relates to multilayer positive temperature coefficient thermistors, and more specifically, to a multilayer positive temperature coefficient thermistor used for overcurrent protection, temperature sensing, and the like.

BACKGROUND ART

There have recently been advances in miniaturization in the field of electronic apparatuses. There have also been advances in the fabrication of positive temperature coefficient thermistors in chip form. For example, multilayer positive temperature coefficient thermistors are known as positive temperature coefficient chip thermistors.

A multilayer positive temperature coefficient thermistor of this type usually includes, for example, a ceramic body in which $BaTiO_3$-based semiconductor ceramic layers and internal electrodes are alternately stacked and includes external electrodes arranged on both ends of the ceramic body, the external electrodes being electrically connected to the internal electrodes, in which adjacent internal electrodes in the stacking direction with semiconductor ceramic layers extend alternately to opposite ends of the ceramic body.

As a conductive material constituting the internal electrodes, an inexpensive base metal material with good conductivity, such as Ni, is widely used. The ceramic body is formed by applying a conductive paste containing a base metal material to ceramic green sheets to be formed into semiconductor ceramic layers by screen printing to form conductive layers, stacking the ceramic green sheets including the conductive layers, sandwiching the resulting stack between ceramic green sheets not including a conductive layer, performing press bonding, and performing co-firing in a predetermined atmosphere. If co-firing is performed in an air atmosphere, the base metal material such as Ni is readily oxidized. Thus, the co-firing is performed in a reducing atmosphere.

Meanwhile, the semiconductor ceramic layers are also reduced in the case where the semiconductor ceramic layers and the internal electrodes are co-fired in a reducing atmosphere as described above, so that a sufficient rate of resistance change is not provided. Thus, attempts are made to ensure a desired rate of change of resistance by performing a reoxidation treatment in an air atmosphere or oxygen atmosphere after the co-firing is performed in a reducing atmosphere.

In the reoxidation treatment, it is difficult to control the heat treatment temperature and to allow oxygen to penetrate into the middle portion of the ceramic body, thereby readily resulting in uneven oxidation. Thus, a sufficient rate of resistance change may fail to be obtained.

For example, Patent Document 1 discloses a ceramic electronic component including a ceramic body impregnated with a glass component and electrodes arranged on surfaces of the main body of the electronic component, in which the ceramic body has a relative density of 90% or less.

In Patent Document 1, a reduction in the sintered density of the semiconductor ceramic layers and an increase in the porosity of the semiconductor ceramic layers seem to facilitate the penetration of oxygen into the middle portion of the ceramic body, thereby ensuring a desired rate of resistance change.

When a multilayer positive temperature coefficient thermistor is mounted on a substrate, the thermistor is usually soldered to the substrate by reflow heat treatment. A high porosity of the semiconductor ceramic layers as in Patent Document 1, however, can cause the penetration of the flux contained in solder into the ceramic body through pores in the semiconductor ceramic layers located on surfaces of the ceramic body, thereby reducing the withstand voltage.

In Patent Document 1, the impregnation of the ceramic body with the glass component results in the formation of glass films in the pores in the surfaces of the ceramic body, thereby preventing the penetration of the flux into the ceramic body.

Patent Document 2 discloses a prior art arrangement in which semiconductor ceramic layers have different porosities. Specifically, a multilayer positive temperature coefficient thermistor is reported in which among a plurality of thermistor layers serving as effective layers arranged between two outermost internal electrodes in the stacking direction, the thermistor layers located in a middle portion in the stacking direction have a higher porosity than that of thermistor layers located outside the middle portion in the stacking direction.

In Patent Document 2, a binder containing an organic material such as polystyrene particles is used, and different ceramic green sheets having different organic material contents are formed. The different ceramic green sheets having different organic material contents are stacked in such a manner that the ceramic green sheets located in the middle portion of a ceramic body in the stacking direction have relatively high organic material contents and that the ceramic green sheets located at outer portions of the ceramic body in the stacking direction have relatively low organic material contents. The resulting stack is subjected to a firing treatment to burn off the organic material, thereby forming pores. Thus, the thermistor layers located in the middle portion of the ceramic body in the stacking direction have a higher porosity than that of the thermistor layers located at the outer portions in the stacking direction. In other words, the thermistor has a structure in which the porosity of the semiconductor ceramic layers located on surfaces of the ceramic body is lower than that in the middle portion of the ceramic body.

[Patent Document 1] Japanese Unexamined Patent Application Publication No. 2002-217004

[Patent Document 1] Japanese Unexamined Patent Application Publication No. 2005-93574

DISCLOSURE OF INVENTION

Problems to be Solved by the Invention

In the case where glass films are formed in pores in surfaces of a ceramic body as described in Patent Document 1, however, the pores may fail to be sufficiently filled with the glass films if the ceramic body has a large number of the pores, depending on the type of glass component and conditions of impregnation, drying, and baking. As a result, flux may penetrate into the ceramic body, reducing the withstand voltage.

In a multilayer positive temperature coefficient thermistor of this type, it is desirable to reduce the porosity of semiconductor ceramic layers located on surfaces of a ceramic body compared with the porosity in the middle portion of the ceramic body, as described in Patent Document 2.

In the case where the different semiconductor ceramic layers with different porosities are formed by a method as described in Patent Document 2, however, the organic material such as polystyrene does not serve as a binder. Thus, ceramic green sheets having a high organic material content are stacked, press-bonded, and fired. In this case, the adhesion between the semiconductor ceramic layers may be insufficient, thereby causing delamination.

Another method for forming semiconductor ceramic layers with different porosities includes using ceramic green sheets with different binder contents.

In the case where ceramic green sheets having different binder contents or different organic material contents are stacked and co-fired with conductive layers forming internal electrodes, however, combustion gases are readily generated from the middle portion of the ceramic body, so that delamination occurs readily.

In the light of these circumstances, it is an object of the present invention to provide a multilayer positive temperature coefficient thermistor having a desired rate of resistance change, in which the thermistor has a structure such that semiconductor ceramic layers located at surfaces of a ceramic body have a lower porosity than that in the middle portion of the ceramic body while the porosity in the middle of the ceramic body is maintained at a high level, as in the related art, the structure resisting delamination or preventing the penetration of flux into the semiconductor ceramic layers.

Means for Solving the Problems

The inventors have conducted intensive studies on the addition of a semiconducting dopant to a ceramic material mainly composed of $BaTiO_3$ and found that an increase in the ionic radius of the semiconductor-forming agent contained in the ceramic material results in a reduction in the porosity of a semiconductor ceramic layer formed by firing at a predetermined firing temperature.

The inventors have conducted further studies and have found that in the case where a semiconducting dopant in a first ceramic portion to be formed into protective layers serving as the outermost layers has a larger ionic radius than that of a semiconductor-forming agent in a second ceramic portion to be effective layers located between internal electrodes, and the semiconductor ceramic layers and the internal electrodes are co-fired, the porosity of the first ceramic portion is lower than that of the second ceramic portion while the porosity of the second ceramic portion containing the effective layers is maintained at a high level.

Furthermore, in the case where the porosity of the first ceramic portion is reduced compared with the second ceramic portion by adding different semiconducting dopants to the first ceramic portion and the second ceramic portion, it is possible to produce a multilayer positive temperature coefficient thermistor with a desired rate of resistance change. In this case, ceramic layers having different proportions of an organic material such as polystyrene or different binder contents need not be used, thereby eliminating delamination or preventing the penetration of flux into the semiconductor ceramic layers.

The present invention was accomplished on the basis of these findings. A multilayer positive temperature coefficient thermistor according to the present invention includes a ceramic body having semiconductor ceramic layers and internal electrodes, the semiconductor ceramic layers being mainly composed of $BaTiO_3$ and containing semiconductor-forming agents, the semiconductor ceramic layers and the internal electrodes being alternately stacked, and the outermost layers of the ceramic body being formed of the semiconductor ceramic layers, in which the outermost layers serve as protective layers and are defined as first ceramic portions, the semiconductor ceramic layers arranged between the outermost internal electrode layers in the thickness direction of the ceramic body serve as effective layers, the semiconductor ceramic layers including at least the effective layers are defined as second ceramic portion, and in which the first ceramic portions contain at least one semiconductor-forming agent having a larger ionic radius than at least one semiconductor-forming agent contained in the second ceramic portion, and the first ceramic portions have a lower porosity than the second ceramic portion.

The term "porosity" is used to indicate the proportion of pores in the semiconductor ceramic layers.

Furthermore, in the multilayer positive temperature coefficient thermistor of the present invention, glass films are preferably formed in pores of at least one of the pair of the first ceramic portions facing a substrate when the thermistor is mounted on the substrate.

Moreover, in the multilayer positive temperature coefficient thermistor of the present invention, the first ceramic portions preferably have a porosity of 10% or less.

In addition, in the multilayer positive temperature coefficient thermistor according to the present invention, the semiconductor-forming agent is at least one selected from the group consisting of La, Ce, Pr, Nd, Sm, Eu, Gd, Tb, Dy, Y, Ho, Er, and Tm.

Advantages

A multilayer positive temperature coefficient thermistor according to the present invention includes a ceramic body having semiconductor ceramic layers and internal electrodes, the semiconductor ceramic layers being mainly composed of $BaTiO_3$ and containing specific semiconductor-forming agents, e.g., La, Pr, or Ce, the semiconductor ceramic layers and the internal electrodes being alternately stacked, and the outermost layers of the ceramic body being formed of the semiconductor ceramic layers, in which the outermost layers serve as protective layers and are defined as first ceramic portions, the semiconductor ceramic layers arranged between the outermost internal electrode layers in the thickness direction of the ceramic body serve as effective layers, the semiconductor ceramic layers including at least the effective layers are defined as second ceramic portion, and in which the first ceramic portions contain at least one semiconductor-forming agent having a larger ionic radius than at least one semiconductor-forming agent contained in the second ceramic portion, and the first ceramic portions have a lower porosity than the second ceramic portion. It is thus possible to reduce the porosity of the first ceramic portions compared with the porosity of the second ceramic portion while the porosity of the second ceramic portion is maintained at a high level even when the semiconductor ceramic layers and the internal electrodes are co-fired. This results in a reduction in the porosity of the first ceramic portions, into which flux penetrates readily and which do not participate in thermistor characteristics, while the second ceramic portion which are arranged between the internal electrodes and which participate directly in thermistor characteristics is maintained at a state in which oxygen penetrates readily during a reoxidation treatment after firing. The penetration of flux into the ceramic body can thus be prevented even when the thermistor is mounted on the substrate by a reflow heat treatment, thereby more assuredly ensuring a desired rate of resistance change.

Furthermore, the difference in the porosity of the semiconductor ceramic layers between the second ceramic portion and the first ceramic portions is obtained by the difference in ionic radius without using an organic material such as polystyrene. Thus, the adhesion between the semiconductor ceramic layers is not affected, so that delamination does not occur.

Furthermore, in the multilayer positive temperature coefficient thermistor of the present invention, glass films are preferably formed in pores of at least one layer of the first ceramic portions facing a substrate when the thermistor is mounted on the substrate. It is thus possible to more assuredly prevent the penetration of flux contained in solder into the ceramic body even when the thermistor is mounted on the substrate by solder reflow treatment.

Moreover, in the multilayer positive temperature coefficient thermistor of the present invention, the first ceramic portions preferably have a porosity of 10% or less. Thus, the first ceramic portions have a low porosity, thereby more assuredly preventing the penetration of flux contained in solder into the ceramic body. This enables the avoidance of an increase in the rate of change of resistance before and after the energizing test even when an energizing test is performed after the thermistor is soldered to a substrate.

Figure 1:
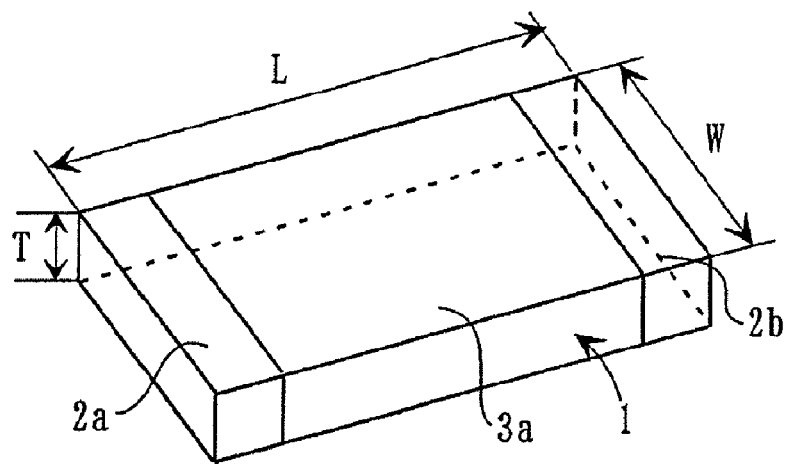
FIG. 1 is a schematic perspective view of a multilayer positive temperature coefficient thermistor according to an embodiment of the present invention.

REFERENCE NUMERALS 1 ceramic body
3a to 3e semiconductor ceramic layer
4a to 4d internal electrode
5 protective layer
6 effective layer

BEST MODES FOR CARRYING OUT THE INVENTION

Embodiments of the present invention will be described in detail below with reference to the attached drawings.

Figure 2:
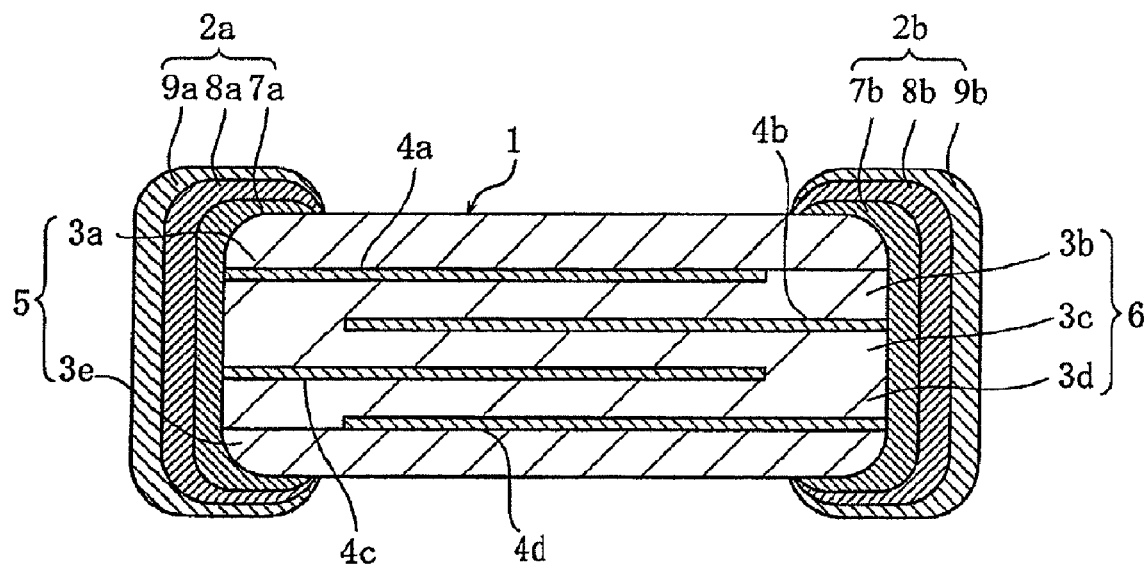
FIG. 2 is a schematic longitudinal sectional view of a multilayer positive temperature coefficient thermistor according to an embodiment of the present invention.

FIG. 1 is a perspective view of a multilayer positive temperature coefficient thermistor according to an embodiment of the present invention. FIG. 2 is a longitudinal sectional view.

In FIGS. 1 and 2, a multilayer positive temperature coefficient thermistor of the present invention is in the form of a chip with a length of L, a width of W, and a thickness of T and includes external electrodes 2a and 2b arranged on both ends of a ceramic body 1.

The ceramic body 1 is mainly composed of $BaTiO_3$ and has a structure in which internal electrodes 4a to 4d semiconductor ceramic layers 3a to 3e containing semiconductor-forming agents and the internal electrodes 4a to 4d are alternately stacked. The outermost layers 3a and 3e serve as protective layers 5. The middle portion arranged between the internal electrode 4a and the internal electrode 4d constitutes effective layers 6.

In the external electrodes 2a and 2b, underlying sub-electrodes 7a and 7b electrically connected to the respective internal electrodes 4a and 4b are arranged on both ends of the ceramic body 1. Surfaces of the underlying sub-electrodes 7a and 7b are covered with first plating films 8a and 8b composed of, for example, Ni. Surfaces of the first plating films 8a and 8b are covered with second plating films 9a and 9b composed of, for example, Sn. The multilayer positive temperature coefficient thermistor has a positive temperature coefficient in which the resistance value between the internal electrodes 4a and 4d is increased with increasing temperature.

The internal electrodes are preferably composed of a material with an excellent ohmic contact to the semiconductor ceramic layers 3a to 3e. For example, a material mainly composed of an elemental base metal, such as Ni and Cu, or an alloy thereof, may be preferably used. The underlying sub-electrodes are preferably composed of a material which can be suitably connected to the internal electrodes 4a to 4d and has good conductivity. Preferred examples of the material that can be used include elemental noble metals, such as Ag and Pd, and alloys thereof such as Ag—Pd; and elemental base metals, such as Ni and Cu, and alloys thereof.

Each of the protective layers 5 (semiconductor ceramic layers 3a and 3e) contains a semiconductor-forming agents having a larger ionic radius than that of a semiconductor-forming agent contained in the effective layers 6 (semiconductor ceramic layers 3b to 3d).

Ionic radii vary with valences, coordination numbers, measurement methods, and the like. Ionic radii used in this embodiment are selected on the basis of ionic radii of semiconductor-forming agents having a coordination number of six. For example, according to "Handbook of Chem. & Phys., 79th Edition", Y. Q. Jia, J. Solid State Chem., 95 (1991)184, at a coordination number of six, $Sm^{3+}$ has an ionic radius of 0.096 nm, $Nd^{3+}$ has an ionic radius of 0.098 nm, and $La^{3+}$ has an ionic radius of 0.103 nm. In the case of using $Sm^{3+}$ as a semiconductor-forming agent for use in the effective layers 6, examples of a semiconductor-forming agent for use in the protective layers 5 include $Nd^{3+}$ and $La^{3+}$ as those have a larger ionic radii than that of $Sm^{3+}$.

In this way, in the case where the ionic radius of the semiconductor-forming agent contained in the protective layers 5 is larger than the ionic radius of the semiconductor-forming agent contained in the effective layers 6, and when ceramic green sheets to be formed into the semiconductor ceramic layers 3a to 3e and conductive layers to be formed into the internal electrodes 4a to 4d are co-fired, the protective layers 5 have a lower porosity than that of the effective layers 6. That is, only the porosity of the protective layers 5 can be reduced while the porosity of the effective layers 6 is maintained at a high level.

A rare-earth element may be used as such a semiconductor-forming agent. Specifically, at least one selected from the group consisting of La, Ce, Pr, Nd, Sm, Eu, Gd, Tb, Dy, Y, Ho, Er, and Tm may be used.

Table 1 shows ionic radii of the semiconductor-forming agents with a coordination number of six.

TABLE 1

| Semiconductor dopant | Ionic radius (nm) |
| --- | --- |
| $La^{3+}$ | 0.103 |
| $Ce^{4+}$ | 0.087 |
| $Pr^{3+}$ | 0.099 |
| $Pr^{4+}$ | 0.085 |
| $Nd^{3+}$ | 0.098 |
| $Sm^{3+}$ | 0.096 |
| $Eu^{3+}$ | 0.095 |

TABLE 1-continued

| Semiconductor dopant | Ionic radius (nm) |
| --- | --- |
| $Gd^{3+}$ | 0.094 |
| $Tb^{3+}$ | 0.092 |
| $Tb^{4+}$ | 0.076 |
| $Dy^{3+}$ | 0.091 |
| $Y^{3+}$ | 0.090 |
| $Ho^{3+}$ | 0.090 |
| $Er^{3+}$ | 0.089 |
| $Tm^{3+}$ | 0.088 |

From "Handbook of chem. & Phys., 79th Edition" Y. Q. Jia, J. Solid State Chem., 95(1991) 184

As described above, semiconductor-forming agents are appropriately selected from these semiconductor-forming agents in such a manner that the semiconductor-forming agent in the protective layers 5 has a larger ionic radius than that of the semiconductor-forming agent in the effective layers 6, when the semiconductor ceramic layers 3a to 3e are formed.

In the case where a plurality of semiconductor-forming agents are added to each of the protective layers 5 and the effective layers 6, proportions of the semiconductor-forming agents are adjusted in such a manner that the semiconductor-forming agents in the protective layers 5 have a larger average ionic radius than that of the semiconductor-forming agents in the effective layers 6.

In FIG. 2, the protective layers and the effective layers are demarcated by the outermost internal electrodes. A semiconductor ceramic layer having the same ionic radius as the effective layers may be arranged outside a corresponding one of the outermost internal electrode layers (i.e., on a side of the corresponding outermost internal electrode layer adjacent to a surface of the ceramic body) as long as the semiconductor ceramic layer has a thickness smaller than that of each protective layer and is arranged on a side of the corresponding outermost internal electrode adjacent to the corresponding effective layer.

In the multilayer positive temperature coefficient thermistor, glass films are preferably arranged in pores in at least one of the protective layers 5, (i.e., the semiconductor ceramic layer 3a or 3e) facing a substrate when the thermistor is mounted on the substrate. That is, the protective layers 5 have a lower porosity than that of the effective layers 6, and the pores in the protective layer 5 facing the substrate are covered with the glass films. In this case, it is possible to more assuredly prevent flux contained in solder from penetrating into the ceramic body 1 when the thermistor is mounted on the substrate by solder reflow heat treatment.

The protective layers 5 do not participate in thermistor characteristics. It is thus obvious that glass films may also be formed in pores in the protective layer 5 remote from the substrate without any problem.

Furthermore, the protective layers 5 preferably have a porosity of 10% or less. This results in a reduction in the rate of change of resistance value before and after an energizing test performed after soldering.

The results of experiments by the inventors demonstrated that in the case where a multilayer positive temperature coefficient thermistor is mounted on a substrate by solder reflow heat treatment, flux may penetrate through the protective layer 5 brought into contact with the substrate, in particular, from a surface portion (L×W surface, see FIG. 1) on a side of a mounting surface. The cause is not clear but is presumed as follows.

The glass films formed in the pores in the semiconductor ceramic layer have minute cracks. Meanwhile, stress is applied between the ceramic body 1 and the underlying sub-electrodes 7a and 7b during mounting. The applied stress may cause the extension of cracks present in the glass films in the vicinity of the surface portion (L×W surface) of the ceramic body 1 and connections between the ceramic body 1 and the underlying sub-electrodes 7a and 7b. In the case where an energizing test is performed in this state, the viscosity of flux that is initially bonded to surfaces of the glass films is reduced as the temperature of the ceramic body 1 is increased, so that the flux is liable to penetrate into the ceramic body 1 through, for example, the cracks in the glass films by capillarity. This may result in an increase in the rate of change of resistance value before and after the energizing test.

As described above, the protective layers 5 preferably have a porosity of 10% or less. That is, the proportion of pores in the protective layers is reduced, so that the glass films are sufficiently formed in the pores, thereby making it possible to more assuredly prevent the penetration of flux into the middle portion of the ceramic body. Even when the energizing test is performed after the thermistor is mounted on a substrate by solder reflow heat treatment, this structure enables the avoidance of an increase in the rate of change of resistance value before and after the energizing test.

The semiconductor ceramic layers 3a to 3e preferably have an overall porosity of 10% to 35%. In this case, oxygen penetrates readily into the middle portion of the ceramic body 1 during reoxidation treatment, thereby providing a multilayer positive temperature coefficient thermistor with an excellent rate of resistance change. An overall porosity of the semiconductor ceramic layers 3a to 3e exceeding 35% can cause a reduction in the strength of the ceramic body 1 and an increase in the resistance value at room temperature. At an overall porosity of the semiconductor ceramic layers 3a to 3e of less than 10%, the reoxidation treatment does not proceed smoothly, so that a sufficient rate of resistance change is not provided. Furthermore, the rate of change of resistance value with time at room temperature is increased.

The ratio of the Ba site to the Ti site, i.e., the Ba/Ti ratio, of a $BaTiO_3$-based ceramic material, which is a main component of the semiconductor ceramic layers 3a to 3e, is preferably in the range of 0.998 to 1.006. The reason for this is described as follows: A Ba/Ti ratio of less than 0.998 is liable to cause a reduction in the rate of resistance change. A Ba/Ti ratio exceeding 1.006 is liable to cause an increase in resistance value at room temperature and destabilizes a rising coefficient of resistance.

Each of the semiconductor ceramic layers 3a to 3e preferably has a semiconductor-forming agent content of 0.1 parts by mole to 0.5 parts by mole with respect to 100 parts by mole of Ti in the $BaTiO_3$-based ceramic material serving as the main component. The reason for this is described as follows: A semiconductor-forming agent content of less than 0.1 parts by mole with respect to 100 parts by mole of Ti does not sufficiently impart semiconductivity to the $BaTiO_3$-based ceramic material. A semiconductor-forming agent content exceeding 0.5 parts by mole with respect to 100 parts by mole of Ti is liable to cause an increase in the resistance value at room temperature.

In the case of using La as a semiconductor-forming agent in the protective layers 5 and using Sm as a semiconductor-forming agent in the effective layers 6, a method for producing a multilayer positive temperature coefficient thermistor will be described in detail below.

$BaCO_3$, $TiO_2$, and $La_2O_3$ are prepared as ceramic raw materials for the protective layers 5. $BaCO_3$, $TiO_2$, and $Sm_2O_3$ are prepared as ceramic raw materials for the effective layers 6. These ceramic raw materials are weighed in predetermined amounts.

These weighed materials are charged into ball mills together with grinding media such as partially stabilized zirconia balls (hereinafter referred to as "PSZ balls") and sufficiently wet-mixed. Each of the resulting mixtures is calcined at a predetermined temperature (e.g., 1,000° C. to 1,200° C.) to form a ceramic raw-material powder for a corresponding one of the protective layers 5 and the effective layers 6.

An organic binder is added to the ceramic raw-material powders. Each of the resulting mixtures is wet-mixed to form a slurry. Each of the resulting slurries for the protective layers 5 and the effective layers 6 is formed into sheets by a sheet forming method, such as a doctor blade method. Thereby, ceramic green sheets for the protective layers 5 and the effective layers 6 are formed.

An internal electrode conductive paste containing a conductive material such as Ni is prepared. The internal electrode conductive paste is applied by, for example, screen printing onto the ceramic green sheets for the effective layers 6 to form conductive layers.

The ceramic green sheets for the effective layers 6, including the printed internal electrode conductive paste are stacked in such a manner that internal electrodes are alternately exposed at both ends of a fired ceramic body. The ceramic green sheets for the protective layers 5, i.e., not including a conductive layer, are stacked on both upper and lower sides of the resulting stack, followed by press bonding to form a green laminate.

The resulting green laminate is cut into pieces having predetermined dimensions. The resulting pieces are placed in an alumina sagger, subjected to a debinding treatment at a predetermined temperature (e.g., 300° C. to 400° C.), and fired in a reducing atmosphere (e.g., $H_2/N_2$=about 1% to 3%) at a predetermined temperature (e.g., 1,100° C. to 1,300° C.), thereby forming the ceramic body 1 in which the internal electrodes 4a to 4d and the semiconductor ceramic layers 3a to 3e are alternately stacked.

Subsequently, the resulting ceramic body 1 is subjected to a reoxidation treatment in an air atmosphere or oxygen atmosphere at a predetermined temperature (e.g., 500° C. to 700° C.). The resulting ceramic body 1 is immersed in a glass solution mainly composed of Si to fill pores in the protective layers 5 located at the surface portions of the ceramic body 1 with a glass component. Then the ceramic body 1 is dried to form glass films in the pores in the protective layers 5.

Sputtering is performed with a target material such as Ag to form the underlying sub-electrodes 7a and 7b on both ends of the ceramic body 1. Then electrolytic plating is performed to form the first plating films 8a and 8b and the second plating films 9a and 9b on surfaces of the underlying sub-electrodes 7a and 7b, thereby affording a multilayer positive temperature coefficient thermistor.

In this embodiment, the protective layers 5 contain a semiconductor-forming agent having a larger ionic radius than that of a semiconductor-forming agent contained in the effective layers 6, so that the protective layers 5 have a lower porosity than that of the effective layers 6. Thus, even when the semiconductor ceramic layers and the internal electrodes are co-fired, the protective layers 5 can have a lower porosity than that of the effective layers 6 while the porosity of the effective layers 6 is maintained at high level, such as in the related art. Therefore, the porosity of the protective layers 5 into which flux penetrates readily and which do not participate in thermistor characteristics can be reduced while the effective layers 6 which are arranged between the internal electrodes 4 (protective layers 5) and which participate directly in thermistor characteristics are maintained at a state in which oxygen penetrates readily into the effective layers 6 during the reoxidation treatment after firing. The penetration of flux into the ceramic body can thus be prevented even when the thermistor is mounted on the substrate by reflow heat treatment, thereby more assuredly ensuring a desired rate of resistance change.

Furthermore, in the semiconductor ceramic layers 3a to 3e, the difference in porosity between the protective layers 5 and the effective layers 6 is obtained by the difference in ionic radius without using an organic material such as polystyrene. Thus, the adhesion between the semiconductor ceramic layers 3a to 3e is not affected, so that delamination does not occur.

The protective layers 5 have a lower porosity than that of the effective layers 6. Thus, the pores can be sufficiently filled with the glass films, thereby more assuredly preventing the penetration of flux contained in solder into the ceramic body 1.

The protective layers 5 preferably have a porosity of 10% or less. That is, the proportion of the pores in the protective layers is reduced. Thus, the pores can be more assuredly filled with the glass films, thereby more assuredly preventing the penetration of the flux into the ceramic body 1. Even when an energizing test is performed after the thermistor is mounted on a substrate by a solder reflow heat treatment, a high rate of change of resistance value before and after the energizing test can be prevented.

The present invention is not limited to the embodiments described above. For example, an insulating layer composed of a glass material or a resin material may be formed on a surface of the ceramic body 1 (excluding portions where the external electrodes 2a and 2b are arranged) including the glass films formed in the pores in one or more of the protective layers 5. The formation of the insulating layer results in the thermistor being less susceptible to an external environment, thereby reducing the deterioration in characteristics caused by temperature, humidity, and the like.

The underlying sub-electrodes 7a and 7b are formed by sputtering in the foregoing embodiments. Alternatively, the underlying sub-electrodes 7a and 7b may be formed by preparing an external electrode conductive paste mainly composed of, for example, Ag and baking the paste on both ends of the ceramic body 1 at a predetermined temperature (e.g., 500° C. to 800° C.). Furthermore, the ceramic body 1 may be subjected to a reoxidation treatment by heat when the external electrode conductive paste is baked.

Moreover, another thin-film-forming method such as vacuum evaporation may be employed to achieve satisfactory adhesion.

In the foregoing embodiments, the oxides are used as the semiconducting ceramic raw materials. Alternatively, carbonates and the like may be used.

The multilayer positive temperature coefficient thermistor of the present invention is useful for overcurrent protection and temperature sensing but use is not limited thereto. In the multilayer positive temperature coefficient thermistor shown in FIG. 2, the internal electrodes 4a to 4d are alternately connected to the underlying sub-electrodes 7a and 7b. Alternatively, at least one pair of adjacent internal electrodes (e.g., 4b and 4c) may be connected to the underlying sub-electrodes 7a and 7b, which are connected to different potentials, through a corresponding one of the semiconductor ceramic layers (e.g., 3c). Other internal electrodes (e.g., 4a and 4d) need not necessarily be alternately connected to the underlying sub-electrodes 7a and 7b. That is, the multilayer positive temperature coefficient thermistor of the present invention is not limited to the multilayer positive temperature coefficient thermistor shown in FIG. 2.

A multilayer positive temperature coefficient thermistor of the present invention will be specifically described below.

EXAMPLES $BaCO_3$, $TiO_2$, $Y_2O_3$, $Dy_2O_3$, $Sm_2O_3$, $Nd_2O_3$, and $La_2O_3$ were prepared as ceramic raw materials. The ceramic raw materials were weighed in such a manner that the composition $(Ba_{0.998}Ln_{0.002})TiO_3$ (wherein Ln represents one of Y, Dy, Sm, Nd, and La) was satisfied.

Ionic radii of $Y^{3+}$, $Dy^{3+}$, $Sm^{3+}$, $Nd^{3+}$, and $La^{3+}$ with a coordination number of six are 0.090 nm, 0.091 nm, 0.096 nm, 0.098 nm, and 0.103 nm, respectively (see Table 1).

Deionized water was added to the weighed materials. The resulting mixture was pulverized in a ball mill together with PSZ balls for 10 hours and then dried. The dry mixture was calcined at 1,100° C. for 2 hours and then pulverized in the ball mill together with the PSZ balls, thereby affording a calcined powder.

An acrylic acid-based organic binder, a dispersant, and deionized water were added to the calcined powder. The resulting mixture was mixed with the PSZ balls for 15 hours to form a ceramic slurry.

The resulting ceramic slurry was formed into sheets by a doctor blade method, followed by drying to form ceramic green sheets containing the semiconductor-forming agent Ln in a combination shown in Table 2 and each having a thickness of 30 μm.

Note that ceramic green sheets to be formed into effective layers and protective layers contained the same amount of the binder.

A Ni metal powder and an organic binder were dispersed in an organic solvent to form an internal electrode conductive paste. The ceramic green sheets to be formed into the effective layers containing the semiconductor-forming agent Ln shown in Table 2 were prepared. The internal electrode conductive paste was applied to a main surface of each ceramic green sheet by screen printing in such a manner that electrodes after sintering had a thickness of about 1.0 μm, thereby forming conductive layers. Then 25 ceramic green sheets including the conductive layers were stacked in such a manner that the internal electrode conductive paste layers were stacked with the ceramic green sheets. As the protective layers, 5 ceramic green sheets containing the semiconductor-forming agent Ln shown in Table 2 were arranged on each of upper and lower sides of the resulting stack. The resulting stack was press-bonded and then cut into green laminates each having a length L of 2.3 mm, a width W of 1.6 mm, and a thickness T of 1.2 mm. The resulting green laminates were placed in an alumina sagger and subjected to a debinding treatment in air at 400° C. for 12 hours. The resulting green laminates were fired for 2 hours in a reducing atmosphere ($H_2/N_2=3\%$) at the firing temperature shown in Table 2, thereby affording ceramic bodies each including semiconductor ceramic layers and internal electrodes alternately stacked.

The resulting ceramic bodies were subjected to barrel polishing. Then the ceramic bodies were immersed in a Li—Si—O-based glass solution mainly containing Si and then dried at 150° C., thereby forming glass films in pores in the protective layers.

Note that the formation of the glass films was determined by WDX.

Next, the ceramic bodies were subjected to a reoxidation treatment at 700° C. in an air atmosphere. Both ends of the each ceramic body were subjected to sputtering with Cu, Cr, and Ag in that order, thereby forming underlying sub-electrodes.

A Ni coating and a Sn coating were formed in that order on the surface of each underlying sub-electrode by electrolytic plating. In this way, 50 multilayer positive temperature coefficient thermistors of each of sample Nos. 1 to 25 were produced.

The resistance of each sample was measured at a room temperature of 25° C. by a four-terminal method. Subsequently, each of the samples was mounted on an alumina substrate by solder reflow heat treatment. The mounted samples were placed in an oven heated at 85° C. An energizing test was performed by applying a voltage of 24 V to the samples for 1,000 hours. The samples were taken from the oven. The resistance value of each of the multilayer positive temperature coefficient thermistors after the energizing test was measured by the four-terminal method at room temperature (25° C.) in the same way as before the mounting.

The porosity of each sample was determined by polishing a section of each ceramic body and measuring the proportion of pores on a polished surface by image processing.

Table 2 shows compositions, firing temperatures, and porosities of sample Nos. 1 to 25, and their rates of change of resistance value at room temperature before and after the energizing test.

TABLE 2

| | $(Ba_{0.998}Ln_{0.002})TiO_3$ | | | | | Rate of change of resistance before and after energizing test (%) |
|---|---|---|---|---|---|---|
| | Semiconducting dopant Ln | | Firing | Porosity (%) | | |
| Sample No. | Effective layer | Protective layer | temperature (° C.) | Effective layer | Protective layer | |
| 1* | Y | Y | 1330 | 13 | 13 | 11.3 |
| 2 | Y | Dy | 1330 | 13 | 10 | 4.7 |
| 3 | Y | Sm | 1330 | 13 | 8 | 2.1 |
| 4 | Y | Nd | 1330 | 13 | 6 | 1.3 |
| 5 | Y | La | 1330 | 13 | 4 | 1.3 |
| 6* | Dy | Y | 1315 | 13 | 16 | 16.2 |
| 7* | Dy | Dy | 1315 | 13 | 13 | 12.4 |
| 8 | Dy | Sm | 1315 | 13 | 10 | 3.8 |
| 9 | Dy | Nd | 1315 | 13 | 9 | 3.1 |
| 10 | Dy | La | 1315 | 13 | 6 | 1.7 |

TABLE 2-continued

| | (Ba$_{0.998}$Ln$_{0.002}$)TiO$_3$ | | | | | Rate of change of resistance |
|---|---|---|---|---|---|---|
| | Semiconducting dopant Ln | | Firing | Porosity (%) | | before and after |
| Sample No. | Effective layer | Protective layer | temperature (° C.) | Effective layer | Protective layer | energizing test (%) |
| 11* | Sm | Y  | 1300 | 13 | 19 | 21.2 |
| 12* | Sm | Dy | 1300 | 13 | 17 | 18.5 |
| 13* | Sm | Sm | 1300 | 13 | 13 | 11.4 |
| 14  | Sm | Nd | 1300 | 13 | 9  | 4.5 |
| 15  | Sm | La | 1300 | 13 | 7  | 1.9 |
| 16* | Nd | Y  | 1275 | 13 | 21 | 31.6 |
| 17* | Nd | Dy | 1275 | 13 | 19 | 24.7 |
| 18* | Nd | Sm | 1275 | 13 | 16 | 19.4 |
| 19* | Nd | Nd | 1275 | 13 | 13 | 13.1 |
| 20  | Nd | La | 1275 | 13 | 8  | 3.3 |
| 21* | La | Y  | 1250 | 13 | 24 | — |
| 22* | La | Dy | 1250 | 13 | 22 | — |
| 23* | La | Sm | 1250 | 13 | 19 | 20.4 |
| 24* | La | Nd | 1250 | 13 | 17 | 15.3 |
| 25* | La | La | 1250 | 13 | 13 | 12.1 |

*Outside the range of the present invention

Table 2 clearly shows the following results: In each of sample Nos. 1, 7, 13, 19, and 25, the same semiconductor-forming agent was contained in the effective layers and the protective layers, and the effective layers and the protective layers had the same porosity (13%). Thus, the rate of change of resistance value before and after the energizing test was in the range of 11.3% to 13.1%, a value which exceeded 10%. The reason for this may be that although the glass films were formed in pores in the surface portion of the ceramic body, flux penetrated into the ceramic body during soldering due to a high porosity of the protective layers.

In sample No. 6, the semiconductor-forming agent Ln contained in the protective layers was Y with an ionic radius of 0.090 nm, and the semiconductor-forming agent Ln contained in the effective layers was Dy with an ionic radius of 0.091 nm. That is, the semiconductor-forming agent Ln contained in the protective layers had a smaller ionic radius than that of the semiconductor-forming agent Ln contained in the effective layers. The protective layers had a high porosity of 16%. For substantially the same reason as in sample No. 1, the rate of change of resistance value before and after the energizing test was as high as 16.2%.

Similarly, in each of sample Nos. 11 and 12, the semiconductor-forming agent Ln contained in the protective layers was Y (ionic radius: 0.090 nm) or Dy (ionic radius: 0.091 nm), and the semiconductor-forming agent Ln contained in the effective layers was Sm (ionic radius: 0.096 nm). That is, the semiconductor-forming agent Ln contained in the protective layers had a smaller ionic radius than the agent used for impartation of semiconductivity to the effective layers. The protective layers had a high porosity of 17% or 19%. For substantially the same reason as in sample No. 1, the rate of change of resistance value before and after the energizing test was as high as 18.5% or 21.2%.

Similarly, in each of sample Nos. 16, 17, and 18, the semiconductor-forming agent Ln contained in the protective layers was Y, Dy, or Sm, and the semiconductor-forming agent Ln contained in the effective layers was Nd (ionic radius: 0.098 nm). That is, the semiconductor-forming agent Ln contained in the protective layers had a smaller ionic radius than agent used for the impartation of semiconductivity to the effective layers. The protective layers had a high porosity of 16% to 21%. For substantially the same reason as in sample No. 1, the rate of change of resistance before and after the energizing test was as high as 19.4% to 31.6%.

In each of sample Nos. 21 to 24, the semiconductor-forming agent Ln contained in the protective layers was Y, Dy, Sm, or Nd, and the semiconductor-forming agent Ln contained in the effective layers was La (ionic radius: 0.103 nm). That is, the semiconductor-forming agent Ln contained in the protective layers had a smaller ionic radius than that of the semiconductor-forming agent Ln contained in the effective layers. The protective layers had a high porosity of 17% to 24%. For substantially the same reason as in sample No. 1, the rate of change of resistance value before and after the energizing test was 15.3% or more. In particular, in sample Nos. 22 and 21 in which the porosities of the protective layers were 22% and 24%, the samples were broken by the energizing test and thus were not measured.

In each of sample Nos. 1, 6, 7, 11 to 13, 17 to 19, and 21 to 25, the semiconductor-forming agent Ln contained in the protective layers had an ionic radius equal to or higher than that of the semiconductor-forming agent Ln contained in the effective layers, thus increasing the porosity of the protective layers and the rate of change of resistance value before and after the energizing test.

In particular, the porosity of the protective layers was increased as the ionic radius of the semiconductor-forming agent Ln contained in the protective layers was reduced compared with the ionic radius of the semiconductor-forming agent Ln contained in the effective layers, so that the rate of change of resistance value before and after the energizing test was increased in proportion to the porosity. At a porosity of the protective layers exceeding 22%, the structure was broken after soldering, thereby causing difficulty in measuring the resistance value.

In contrast, in each of sample Nos. 2 to 5, 8 to 10, 14, 15, and 20, the semiconductor-forming agent contained in the protective layers had a larger ionic diameter than that of the semiconductor-forming agent contained in the effective layers. Thus, the protective layers had a lower porosity than that of the effective layers and a porosity of 10% or less while the porosity of the effective layers was maintained at a high level, such as that in the related art. As a result, the rate of change of resistance value before and after the energizing test was as low as 5% or less.

The invention claimed is:

1. A multilayer positive temperature coefficient thermistor comprising:
   a ceramic body comprising an effective portion sandwiched between a pair of protective portions, each protective portion comprising at least one layer of a barium titanate containing at least one semiconductor-forming agent, the effective portion comprising a plurality of alternately stacked semiconductor ceramic layers and internal electrodes, the semiconductor ceramic layers comprising a barium titanate and at least one semiconductor-forming agent,
   wherein the average ionic radius of the semiconductor-forming agent(s) in the protective portions is larger than the average ionic radius of the semiconductor-forming agent(s) contained in the effective portion, and the protective portions have a lower porosity than the effective portion.

2. The multilayer positive temperature coefficient thermistor according to claim 1, wherein pores of at least one of the pair of the protective portions contain a glass material.

3. The multilayer positive temperature coefficient thermistor according to claim 2, wherein the protective portions have a porosity of 10% or less.

4. The multilayer positive temperature coefficient thermistor according to claim 3, wherein the semiconductor-forming agent is at least one member selected from the group consisting of La, Ce, Pr, Nd, Sm, Eu, Gd, Tb, Dy, Y, Ho, Er, and Tm.

5. The multilayer positive temperature coefficient thermistor according to claim 4, wherein the effective portion barium titanate layers have a porosity of 10 to 35%.

6. The multilayer positive temperature coefficient thermistor according to claim 5, wherein each barium titanate layer contains 0.1 to 0.5 mole parts of semiconductor-forming agent per 100 mole parts of Ti in the titanate.

7. The multilayer positive temperature coefficient thermistor according to claim 6, wherein the effective portion has a first barium titanate layer disposed between the adjacent protective portion and the internal electrode closest to that protective portion, the first barium titanate layer having a smaller thickness than the adjacent protective portion.

8. The multilayer positive temperature coefficient thermistor according to claim 1, wherein the protective portions have a porosity of 10% or less.

9. The multilayer positive temperature coefficient thermistor according to claim 1, wherein the semiconductor-forming agent is at least one member selected from the group consisting of La, Ce, Pr, Nd, Sm, Eu, Gd, Tb, Dy, Y, Ho, Er, and Tm.

10. The multilayer positive temperature coefficient thermistor according to claim 1, wherein the effective portion barium titanate layers have a porosity of 10 to 35%.

11. The multilayer positive temperature coefficient thermistor according to claim 1, wherein each barium titanate layer contains 0.1 to 0.5 mole parts of semiconductor-forming agent per 100 mole parts of Ti in the titanate.

12. The multilayer positive temperature coefficient thermistor according to claim 1, wherein the effective portion has a first barium titanate layer between the adjacent protective portion and the internal electrode closest to that protective portion, the first barium titanate layer having a smaller thickness than the adjacent protective portion.

13. The multilayer positive temperature coefficient thermistor according to claim 12 mounted on a substrate with a protective portion adjacent the substrate.

14. The multilayer positive temperature coefficient thermistor according to claim 11 mounted on a substrate with a protective portion adjacent the substrate.

15. The multilayer positive temperature coefficient thermistor according to claim 10 mounted on a substrate with a protective portion adjacent the substrate.

16. The multilayer positive temperature coefficient thermistor according to claim 9 mounted on a substrate with a protective portion adjacent the substrate.

17. The multilayer positive temperature coefficient thermistor according to claim 8 mounted on a substrate with a protective portion adjacent the substrate.

18. The multilayer positive temperature coefficient thermistor according to claim 4 mounted on a substrate with a protective portion containing a glass material adjacent the substrate.

19. The multilayer positive temperature coefficient thermistor according to claim 2 mounted on a substrate with a protective portion containing a glass material adjacent the substrate.

20. The multilayer positive temperature coefficient thermistor according to claim 1 mounted on a substrate with a protective portion adjacent the substrate.

* * * * *